Figure 1:
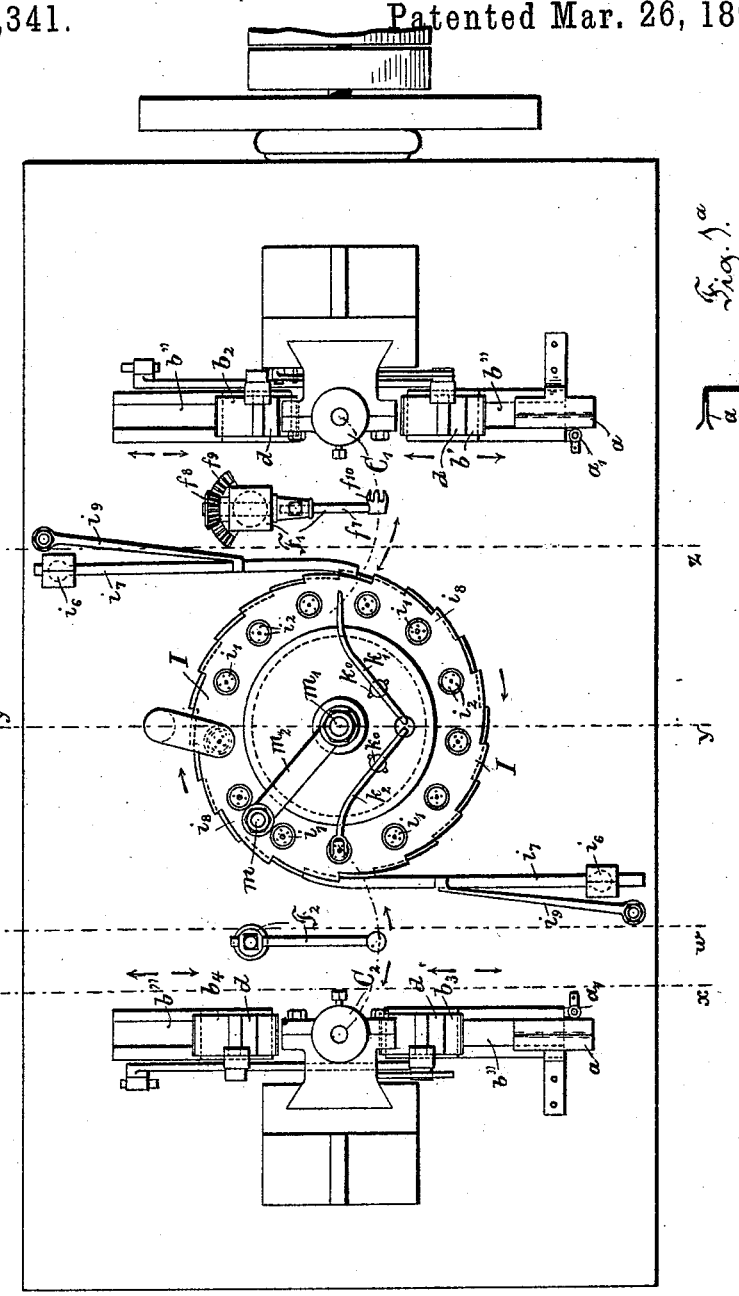

(No Model.) 5 Sheets—Sheet 1.
H. C. HANSEN.
MACHINE FOR MANUFACTURING BUTTONS.

No. 536,341. Patented Mar. 26, 1895.

Witnesses:
E. K. Sturtevant
A. S. Büsing

Inventor:
Hans Christian Hansen,
By
Attorneys.

(No Model.) 5 Sheets—Sheet 2.
H. C. HANSEN.
MACHINE FOR MANUFACTURING BUTTONS.
No. 536,341. Patented Mar. 26, 1895.
Fig. 2.
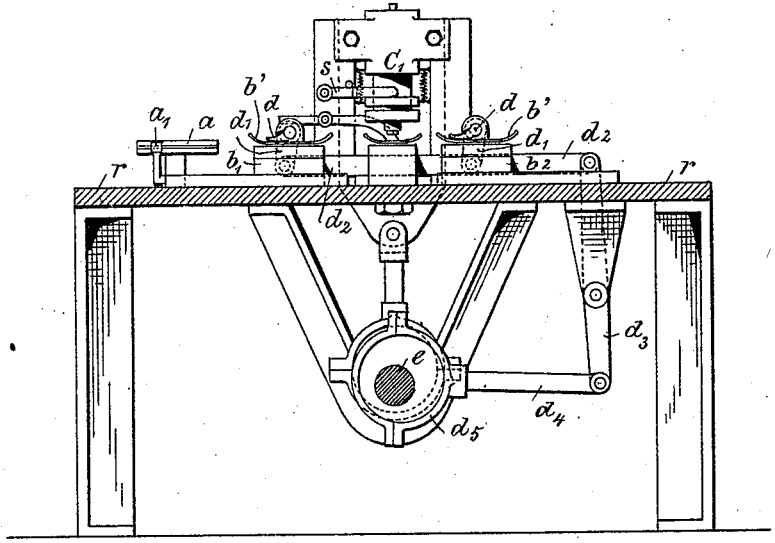
Fig. 3.
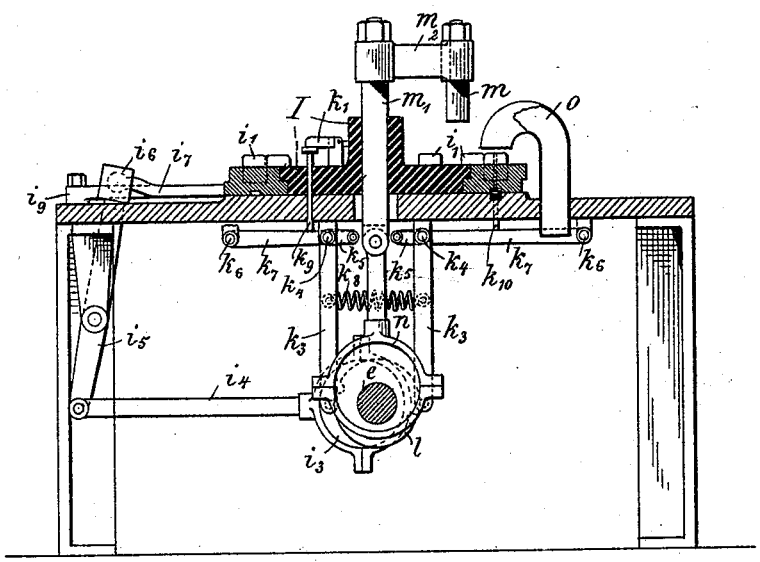
Witnesses: Fig. 3  Inventor:
E. K. Sturtevant. Hans Christian Hansen.
A. S. Büsing. By Reinardo
Attorneys.

(No Model.) 5 Sheets—Sheet 3.
H. C. HANSEN.
MACHINE FOR MANUFACTURING BUTTONS.
No. 536,341. Patented Mar. 26, 1895.
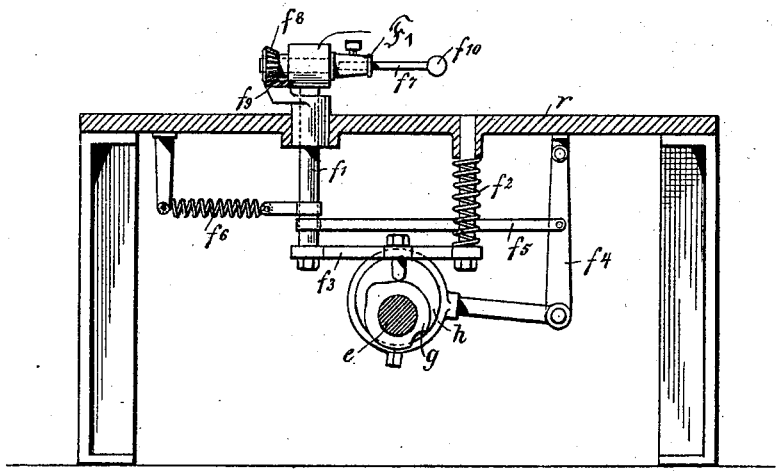
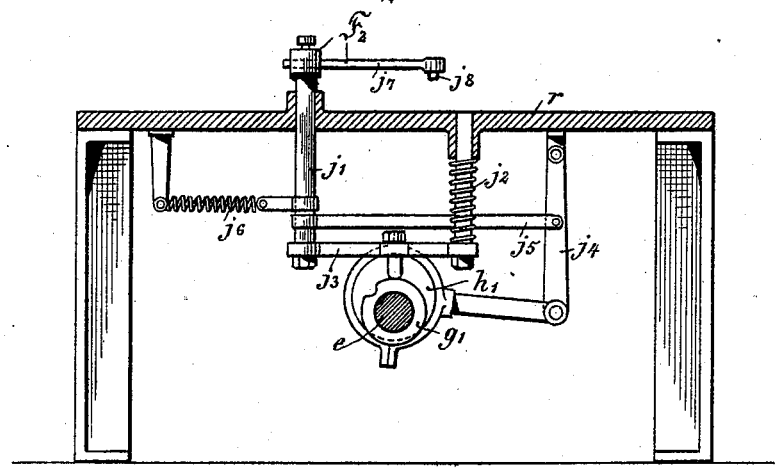

(No Model.) 5 Sheets—Sheet 4.
H. C. HANSEN.
MACHINE FOR MANUFACTURING BUTTONS.
No. 536,341. Patented Mar. 26, 1895.
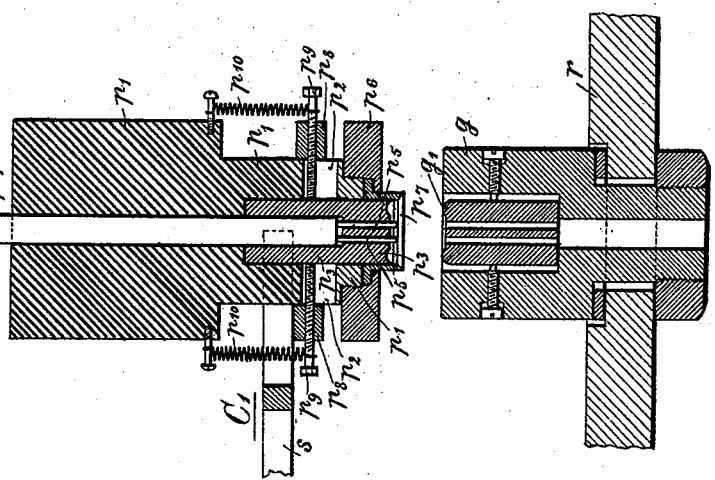
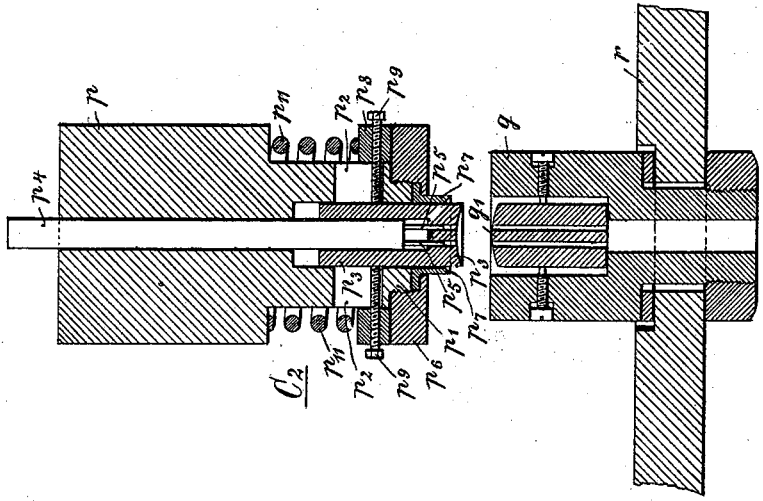
Witnesses:
E. H. Sturtevant
A. S. Büsing
Inventor:
Hans Christian Hansen
By Richards
Attorneys.

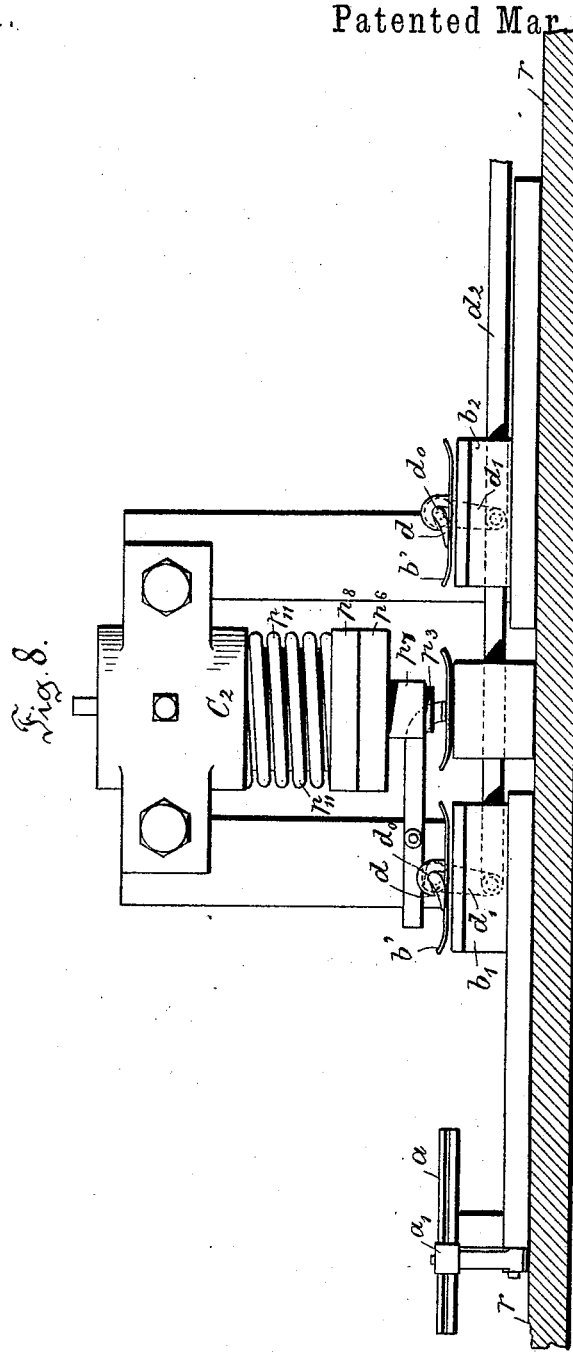

UNITED STATES PATENT OFFICE.

HANS CHRISTIAN HANSEN, OF GJÖVIK, NORWAY.

MACHINE FOR MANUFACTURING BUTTONS.

SPECIFICATION forming part of Letters Patent No. 536,341, dated March 26, 1895.

Application filed August 22, 1894. Serial No. 521,005. (No model.) Patented in Norway December 29, 1893, No. 3,358, and in England February 3, 1894, No. 24,964.

*To all whom it may concern:*

Be it known that I, HANS CHRISTIAN HANSEN, a subject of the King of Sweden and Norway, and a resident of Gjövik, Norway, have invented certain new and useful Improvements in Machines for Manufacturing Buttons, of which the following is a specification.

The invention has been patented in Norway, No. 3,358, dated December 29, 1893, and in England, No. 24,964, dated February 3, 1894.

My invention relates to a machine for manufacturing buttons.

In such machines as hitherto constructed the buttons have been partially prepared in one or more pressing machines, and the parts afterward joined by hand or by another machine.

The object of my invention is to provide a machine which will completely and continuously manufacture buttons and for this purpose the strips of tinplate or sheet-metal from which the buttons are to be made, are conducted into the machine in two places, one strip on each side of the machine table. The strips are fed by hand into a guiding or feed mechanism, which by means of an arrangement, hereinafter described, conducts the strips in below the punch, which at the same time punches out the parts of the button and the holes in the middle of the same and gives the said parts their required form.

When the punches have punched out the parts of the button the latter are conveyed to an intermittently rotating pressing disk by means of two carriers one of which turns one part of the button so that the side which forms the outer surface of the button comes downward on the pressing disk, while the other conducts the part of the button to the part first brought, whereupon the punch above presses the parts of the button together and the ready made button can then be pushed out of the machine.

To enable my invention to be fully understood I will describe how it can be carried into practice by reference to the accompanying drawings, in which—

Figure 1 is a plan of a machine for manufacturing buttons constructed according to my invention. Fig 1$^a$ is an elevation of a detail of the same. Fig. 2 is a section of the machine on the line $x$—$x$ of Fig. 1. Fig. 3 is a section on the line $y$—$y$ of Fig. 1 showing the press and punch arrangement. Figs. 3$^a$ and 3$^b$ are sections of details. Fig. 4 is a section of the machine on the line $z$—$z$ of Fig. 1, showing one of the carriers. Fig. 5 is a section on the line $w$—$w$ of Fig. 1. Fig. 6 is a vertical section of one of the punches. Fig. 7 is a similar view of the other punch. Fig. 8 is an elevation showing the actuating mechanism of the feeding device.

$a$ is a guide plate through which the strip of metal is fed by hand into the machine, it being further guided by the roller $a'$ until it reaches the carriage $b'$ between the spring plate of which $b^*$ (Fig. 8) and the support it is clamped fast (Figs. 1 and 2). This carriage which slides in a groove $b''$ has a forward and backward movement imparted to it in the direction of the arrows and each time it feeds a part of the metal strip under the punch arrangement $C'$ hereinafter described and shown most clearly in detail in Figs. 6 and 7, whereby a round piece corresponding to the circumference of the button is punched out. Afterward the strip passes into the other carriage $b^2$ which conducts the punched metal strip out of the machine into a receiver or the like. The clamping of the strip each time it is fed forward is effected by a pawl $d$, which is keyed to a pivot $d^0$ and by means of an arrangement of cranks $d'$, rods $d^2$, and $d^4$ and levers $d^3$ driven from an eccentric $d^5$ (Figs. 1, 2 and 8) on the main shaft $e$ is moved slightly up from and down onto the metal strip at each stroke of the eccentric the arrangement of rods moving the carriages $b'$, $b^2$ forward and backward in consequence of the pawl $d$ alternately pressing upon the metal strip and spring plate $b^*$ (Fig. 8) so that the crank $d'$ is held fast and thereby transfers its further movement to the carriages $b'$, $b^2$. On the other side of the machine is another feeding arrangement $b^3$, $b^4$ exactly like $b'$, $b^2$ for another metal strip from which also by means of the punch $C^2$ round button-pieces are punched. These two punches $C'$, $C^2$ which will be hereinafter more particularly described differ however from each other in that the first holds the button piece while the other releases it immediately after the punching. From these punches the button-pieces are conveyed in the following manner.

F' is a carrier for the button-piece from the punch C' and has three movements, one jumping or upward and down movement effected by an eccentric $g$ (Fig. 4) with a swell and a notch or depression on the main shaft $e$, moving up a rod $f'$ which is immediately afterward forced down by a spring $f^2$ on the other end of a connecting-rod $f^3$ The carriage F' has also an oscillating movement in a horizontal plane in the directions of the arrows imparted to it by an eccentric $h$ which communicates an oscillating motion to a lever $f^4$ and this lever $f^4$ acts upon the spring board or strip $f^5$ which is twisted like a spiral spring round the rod $f'$ and by which, assisted by the spring $f^6$, the rod $f''$ is caused to oscillate. The third movement of the carriage is that of the rod $f^7$ round its own axis, caused by the bevel-wheel $f^8$ which gears with the toothed segment $f^9$ and during the horizontal oscillating movement of the carriage causes the turning movement of the rod $f^7$. The rod $f^7$ has, as shown in Fig. 1, a four-toothed claw $f^{10}$, the teeth of which are somewhat flexible. Each time the rod $f^7$ oscillates in a horizontal plane the said turning and up and down movements take place, so that when the claw $f^{10}$ is under the punching arrangement C', the claws are turned upward at the same time as the rod $f'$ is lifted and thereby catches the metal piece punched out in the punching arrangement. Immediately after the rod $f^7$ swinging again in a horizontal plane against the pressing disk I, the rod $f^7$ turns so that the claw $f^{10}$ comes down and as soon as this has come above one of the plates $i'$ the rod $f'$ receives a push downward with the result that the part of the button being in the claw $f^{10}$, is spitted on the four prongs $i^2$ on the plate $i'$ which prongs just correspond to the holes in the part of the button.

The arrangement of the two eccentrics $g$ and $h$ and the swell and depression of the eccentric $g$ is such, that the up and down, swinging and turning movements of the carriage F' take place separately at the proper times as before described. (See Fig. 4.)

The disk I receives an intermittent rotation in the direction of the arrow caused by an eccentric $i^3$ keyed to the main-shaft $e$ (Figs. 1 and 3) which eccentric through the medium of rods $i^4$ and $i^5$ and a ball and socket joint $i^6$ causes a rod or pawl $i^7$ to work in ratchet teeth $i^8$ on the disk I. $i^9$ is a spring which keeps the rod or pawl $i^7$ close to the teeth $i^8$. The rods or pawls $i^7$ one on each side of the pressing disk I, work intermittently and alternately so that at each stroke they separately take up a position against the teeth $i^8$ as shown in Fig. 1.

The second carrier $F^2$ is shown in Figs. 1 and 5 and is placed opposite F' but is more simply arranged, it only having an up and down motion and an oscillating motion in a horizontal plane. For actuating it two eccentrics $g'$ and $h'$ are employed keyed to the main shaft $e$ of which the eccentric $g'$ has a notch or depression. The oscillating motion of the carrier $F^2$ with its arm $j^7$ in a horizontal plane, from the punching arrangement $C^2$ to the pressing disk I is caused by an arrangement of rod $j'$, spring $j^2$, connecting rod $j^3$, lever $j^4$, spring band or strip $j^5$ and spring $j^6$ just like that provided for the carrier F'. As before stated the part of the button punched out in the punching arrangement $C^2$ is released from the punch immediately after the punching and lies on the matrix. When now the arm $j^7$ is above the matrix, it receives a push downward through the notch in the eccentric $g'$, by which the prongs on the under side of the arm $j^7$ are caused to enter the holes in the part of the button. At the next moment the arm $j^7$ swings in the horizontal plane against the pressing disk I until the carried button piece is right above one of the plates $i'$ videlicit, above one of the pieces brought from the punch C'. The piece brought from the punch C' forms the front side of the button, while the piece from $C^2$ forms the back.

Both the parts of the button separate from their respective carriers and are kept back on the plates $i'$ by two levers $k'$, $k^2$ (Figs. 1 and 3) catching respectively into the claw $f^{10}$ and the teeth $j^8$ above the part of the button and at the right moment these levers swing round upon their pivots $k^0$, $k^0$ and strike the parts off the claw $f^{10}$ and teeth $j^8$ respectively by their free ends receiving an upward stroke from the following rod arrangement shown in Fig. 3. On the main-shaft $e$ is keyed an eccentric $l$ having two diametrically opposite notches. On this eccentric bear the free ends of two rods $k^3$, $k^3$ oscilating on pivots $k^4$, $k^4$ in the machine-table. To these pivots are keyed two small levers $k^5$, $k^5$ to which levers are attached rods $k^7$, $k^7$ mounted on pivots $k^6$, $k^6$ in the machine-table.

It will be obvious that the rods $k^3$, $k^3$ as soon as their free ends (which are furnished with small rollers and are acted upon by a spring $k^8$) take into the notches on the eccentric $l$, will cause the keyed levers $k^5$, $k^5$ and the rods $k^7$, $k^7$ to rock. One of the rods $k^7$ will thereby be caused to slightly push the rod $k^9$, working loose in the machine-table which rod $k^9$ then strikes upward on the free ends of the levers $k'$, $k^2$ as before described. The two parts of the button brought to the plates $i'$ one on top of the other (as shown in Fig. 3$^a$) are now joined or put together so as to form a complete button (as shown at Fig. 3$^b$), by a punch $m$ (Fig. 3) with a concave under side. As soon as every one of the plates $i'$ during the intermittent rotation of the disk I (Figs. 1 and 3) has passed beneath the punch $m$, the latter is carried down by an eccentric $n$ on the main-shaft $e$ and an arrangement of rod $m'$ and arm $m^2$, the parts of the button being thereby pressed together, as will be clearly understood by reference to Figs. 3, 3$^a$, and 3$^b$. By the further rotation of the disk I the ready made button is brought under an exhaust tube $o$ and is here pushed out of the machine by a rod $k^{10}$ working loosely in the machine-table, and actuated from an eccentric $l$ similarly to the rod $k^9$ and by a similar arrangement $k^3$, $k^4$, $k^5$, $k^6$, $k^7$.

There only remains now to describe the punching arrangements C' and C$^2$.

The first is represented at Fig. 6 the body $p'$ of the punch being furnished with holes or sockets $p^2$ on each side. Within this body is a punch or die $p^3$ and in the interior of this is a rod $p^4$ provided with pins $p^5$. Securely connected to the body $p'$ by screw-threads and a nut $p^6$ is the cutter or punch proper $p^7$ and securely but detachably connected with the die $p^3$ by means of set screws $p^9$, is a ring $p^8$ the said set screws being also connected with the body $p'$ by springs $p^{10}$. $q$ is the bed or support of the matrix $q'$ which together with the punch gives the part of the button its required shape. $r$ is the table of the machine. When the metal strips are brought in under the punch and the punch descends the cutter $p^7$ first cuts off a small piece, and then the inner punch or die $p^3$ presses the said piece against the matrix $q'$ and forms it of the required shape for the front of the button at the same time that the pins $p^5$ entering corresponding holes in the matrix punch the sewing holes (usually four) in the part of the button. When now the punch again rises the elasticity or spring of the edge of the button-piece after the punching will cause the button piece to be retained within the cutter $p^7$ until the ring $p^8$ comes against a fork $s$ embracing the body $p'$ thereby stopping both the ring $p^8$ and the punch $p^3$, which latter during the further upward movement of the body $p'$, will force the piece out just at the moment that the claw $f^{10}$ is immediately beneath it, which claw then takes hold of the button-piece and conveys it to the pressing disk I.

It will be understood that the rod $p^4$ carrying the pins $p^5$ is fixed to and movable with the block or body $p'$.

The second punching arrangement C$^2$ is nearly the same as C'. $p'$ is the punch body with sockets or holes $p^2$. Inside this punch-body is the punch $p^3$ securely but detachably connected with the ring $p^8$ by screws $p^9$. Inside the punch $p^3$ is the rod $p^4$ with pins $p^5$ and the cutter $p^7$ securely connected with the body $p'$, by the nut $p^6$. The ring $p^8$ is however here acted on by a larger downwardly-acting spiral spring $p^{11}$ and the operation is as follows: When the punch body descends the punch $p^3$ first presses against the metal-strip, but gives way and acts against the counteracting spring $p^{11}$, until, after the cutter $p^7$ has punched out the round button-piece, it comes against the bottom of the body $p'$ and in conjunction with the matrix $q'$ forms the back part of the button. When the punch-body again rises the punch $p^3$ is retained a little on account of the spring $p^{11}$ until the cutter $p^7$ has completely released its hold of the part of the button and the screws $p^9$ with the ring $p^8$ are moved downward in the sockets or holes $p^2$, when the punch $p^3$ also leaves, and the button-part is left on the matrix whence it is brought to the pressing disk I as before described. The whole machine works accurately and quickly and the product is highly satisfactory.

The punches move in ways shown clearly in plan in Fig. 1, and any well known means may be used for operating them.

Having now particularly described and ascertained the nature of my said invention and in what manner the same is to be performed, I declare that what I claim is—

1. In a button machine, the punching device for forming the front of the button, the punching device for forming the back, the step by step table with operating means therefor, the plates or seats thereon for the button parts, the swinging carrier arms F', F$^2$ for placing the button parts one on top of the other upon the seats and the pressing or punching device for uniting the button parts, substantially as described.

2. In combination in a button machine, the punching die for the front of the button, the die for the back, the step by step table having seats for the button parts, the swinging carrier arms F' F$^2$, the pressing device comprising the presser $m$, the arm $m^2$ the rod $m'$ passing through the table and the eccentric for operating the rod and the discharge means for the button, substantially as described.

3. In combination in a button making machine, the die adapted to shape one part of the button and having pins to form holes therein, the step by step table having seats with pins adapted to the holes in the button part, the carrier for the said button part having pins to engage with the holes thereof, a second die for the other part of the button, a second carrier and pressing mechanism, substantially as described.

4. In combination, the punching die the table having step by step movement and a series of seats to receive the button parts, and the carrier arm having swinging movement and an up and down movement and means for operating the carrier arm, substantially as described.

5. In combination in a button machine, the die for forming one part of the button and having pins to perforate the same, the table with means for operating the same step by step, the seats on said table, having pins to receive the perforated button, the carrier arm having claws or pins, means for oscillating the arm and causing the same to move up and down and rotate about its axis, a second die and carrier arm and punching or pressing mechanism for the button parts, substantially as described.

6. In combination, the dies, the table having seats for the button parts, the swinging carrier arms and the levers $k'$ $k^2$ with operating means therefor arranged to discharge the button parts from the carrier arms onto the button seats, substantially as described.

7. In combination, the dies, the table having seats for the button parts, the swinging carrier arm $F'$ having the claws, the pinion and segment for rotating the arm as it oscillates the second carrier arm and the press, substantially as described.

8. In combination in a button machine, the die comprising the matrix $q'$, the cutter $p^7$, the inner presser $p^3$, the pins $p^5$ within the presser, the die body $p'$ carrying the said parts the ring $p^8$ movable in relation to the cutter $p^7$, and connected to the presser $p^3$ and the spring connected with the ring for controlling the action thereof, substantially as described.

In testimony that I claim the foregoing as my invention I have signed my name, in presence of two witnesses, this 7th day of July, 1894.

HANS CHRISTIAN HANSEN.

Witnesses:
ABEL GOTTFRED GRÖNN LAHN,
OSCAR WINGE.